May 28, 1929.  W. M. SHOEMAKER, JR  1,714,640
METHOD OF MAKING FIBER BOARD
Filed Aug. 13, 1927  3 Sheets-Sheet 1
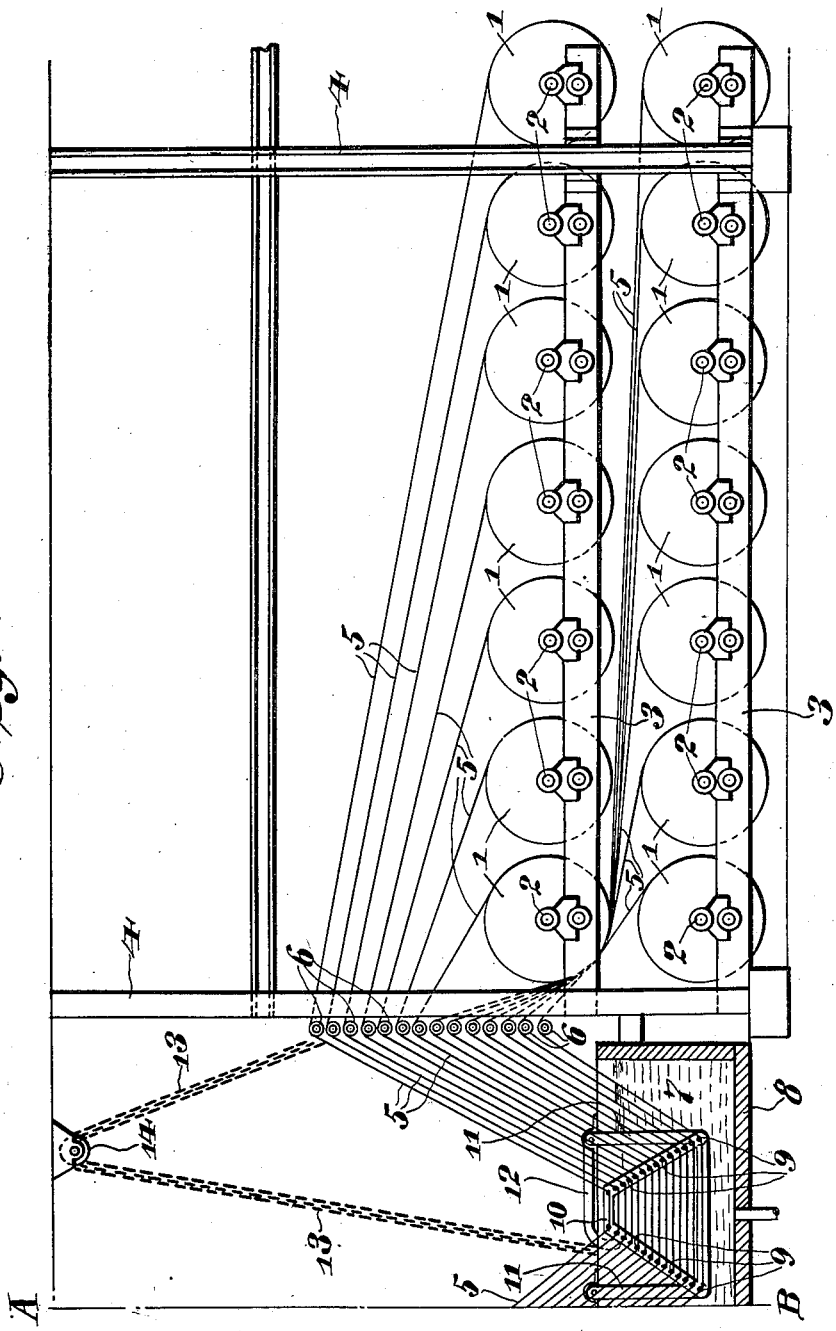
INVENTOR
William M. Shoemaker Jr.
BY Cyrus W. Anderson
ATTORNEY

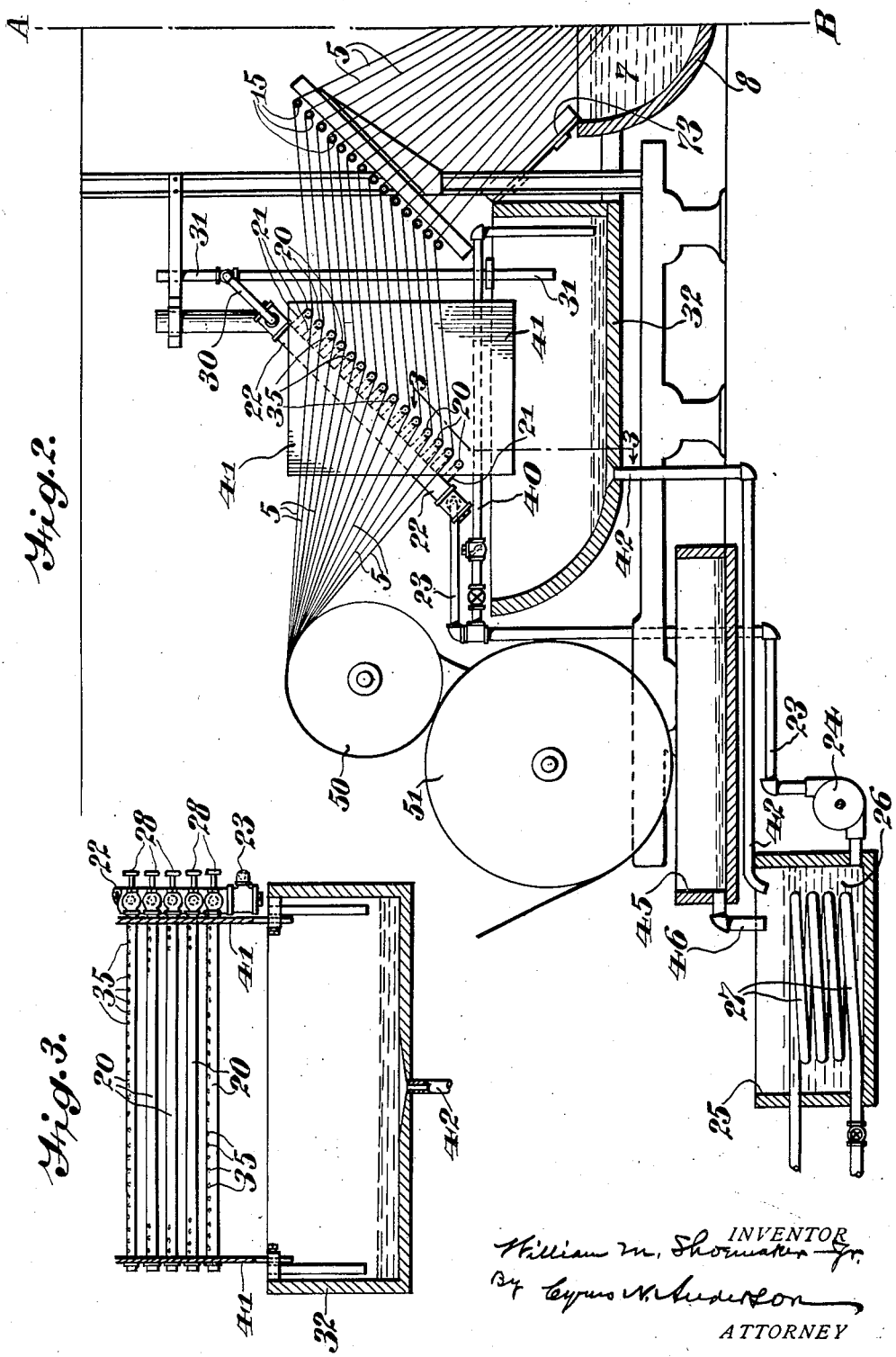

May 28, 1929.  W. M. SHOEMAKER, JR  1,714,640
METHOD OF MAKING FIBER BOARD
Filed Aug. 13, 1927    3 Sheets-Sheet 3
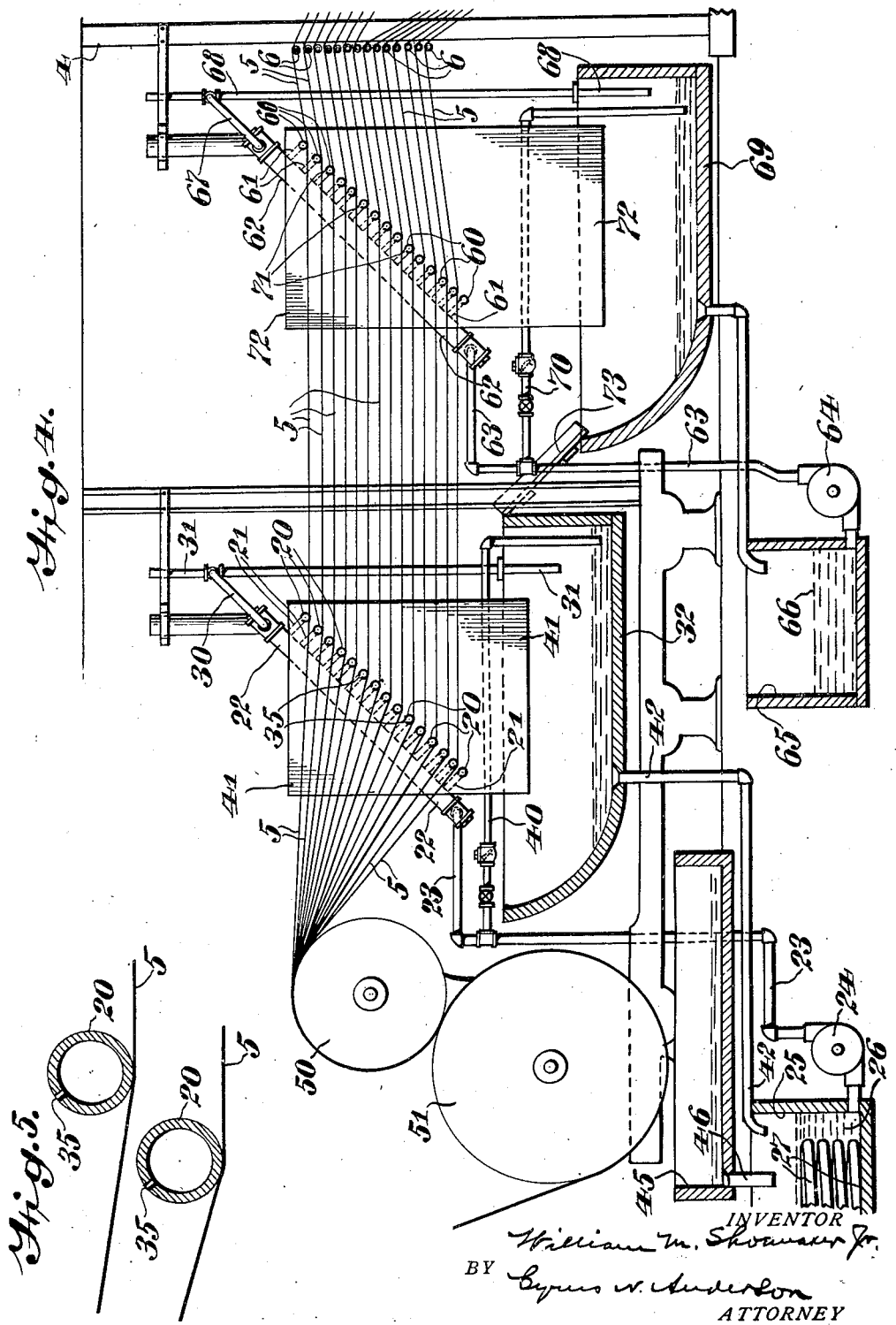
INVENTOR
William M. Shoemaker Jr.
BY Cyrus N. Anderson
ATTORNEY Patented May 28, 1929.

1,714,640

UNITED STATES PATENT OFFICE.

WILLIAM M. SHOEMAKER, JR., OF KENNETT SQUARE, PENNSYLVANIA, ASSIGNOR TO NATIONAL VULCANIZED FIBRE COMPANY, OF WILMINGTON, DELAWARE, A CORPORATION OF DELAWARE.

METHOD OF MAKING FIBER BOARD.

Application filed August 13, 1927. Serial No. 212,658.

My invention relates to methods of making fiber board.

In the manufacture of fiber board, sheets of unsized and unloaded paper consisting usually of cotton cellulose are employed. Either a plurality of sheets are united or else a single sheet is wound about a drum a sufficient number of times to produce the thickness of board desired.

In order to unite the sheets into fiber board they are first subjected to the action of a suitable chemical, for example, zinc chloride in solution, which is quite generally employed. After having been thus treated they are subjected to heat and to pressure whereby union thereof is effected. In one method heretofore employed the heat and pressure have been applied simultaneously to the opposite sides of a plurality of sheets in contact with each other. Another method heretofore employed has consisted in the application of heat of the requisite temperature to each sheet separately, after which the sheets are brought together and subjected to the action of pressure to effect union thereof.

My invention relates to improvements in the latter method and it has for one of its objects to provide an improved and novel method by which the application of heat to the previously chemically treated sheets may be effected.

It also has for its object to provide a novel method by which the heat may be applied simultaneously and directly to the opposite sides of each sheet for the purpose of producing therein the temperature necessary to be employed in the manufacture of fiber board.

To these and other ends my invention comprehends the method as disclosed and described herein and particularly pointed out in the claims.

It will be understood that in the practicing of my invention the method as disclosed herein may be varied within the scope of the claims without departing from the said invention or the principle thereof.

In the practical use of the invention it will be necessary that suitable apparatus be employed, and to that end I have provided an apparatus to which reference will be made for a more convenient and ready understanding of the said invention. Reference is made to the said apparatus for purposes of description and not by way of limitation.

In the drawings:

Fig. 1 is a view partly in side elevation and partly in longitudinal sectional elevation of a portion of the apparatus in which the invention is embodied;

Fig. 2 is a longitudinal sectional elevation of the remaining portion of the machine;

Fig. 3 is a transverse sectional view taken on the line 3—3 of Fig. 2;

Fig. 4 is a longitudinal sectional view similar to that shown in Fig. 2 but showing a modification of the structure; and Fig. 5 is a transverse sectional view of a fragmentary portion of the structure showing more clearly a detail of the construction.

It will be understood that if Figs. 1 and 2 be so placed in relation to each other that the dot and dash lines A—B overlie each other an illustration of the complete machine will be obtained.

In the drawings I have shown a plurality of rolls 1 of paper which are mounted upon rotatable shafts 2, which are mounted at their opposite ends in bearings supported upon the opposite side members 3 of the frame structure comprising uprights 4.

The sheets of paper 5 which are drawn from the rolls 1 over guides 6, are mounted, one above the other, upon the frame structure of the apparatus. From the guides 6 the sheets 5 extend downwardly and are guided through a body of a suitable liquid solvent 7, usually water, containing a suitable chemical in solution, for example, zinc chloride, which solution usually is of a strength or density of approximately 70 degrees Baumé. The liquid solution is contained in a receptacle 8 of usual construction. The sheets 5 are guided through the solution 7 underneath guide rods 9, which are supported at their opposite ends in the opposite sides of A-shaped frames 10, only one of which is shown. These frames are suspended within the receptacle or container 8 by means of parallel links 11, which links are adapted to be pivotally operated by means of handles or levers 12 to elevate the said frames together with the rods carried thereby to positions outside of the receptacle or container 8 and to lower the same thereinto. The said frames are moved into elevated position for the more convenient threading of the sheets 5 underneath the guide rods 9, previously referred to. For convenience in effecting the elevation and lowering of the frames 10 chains 13 are provided which extend over rollers 14 as indicated.

From the guide rods 9 the sheets are conveyed forwardly to and over guide rods 15 supported upon the frame structure of the machine and from the latter they extend in a slightly downward direction underneath horizontally arranged tubes 20 mounted in a plane substantially parallel with the plane in which the rods 15 are mounted. Each sheet extends under a tube as shown. Each of these tubes is connected at one end by means of a short branch connecting pipe 21 with a manifold 22 to the lower end of which is connected one end of a liquid supply pipe 23. The lower end of the latter pipe is connected to the discharge side of a suitable pump 24, the opposite side of which is in communication with a tank 25 containing a liquid 26 which is adapted to be heated by a steam coil 27. The supply of liquid to the tubes 20 is adapted to be controlled by valves 28. The upper end of the manifold pipe 22 is provided with an upwardly projecting tubular extension 30 which is in communication with an overflow pipe 31 which is adapted to discharge the overflow liquid into a receiving tank or receptacle 32. The height of the tubular extension 30 above the upper end of the manifold pipe 22 is such as to provide in the latter a sufficient head to exert pressure in tubes 20 to effect the discharge of the liquid thereform through the openings 35 in small streams. The openings are so placed in the said tubes or pipes 20 that the small streams of liquid issue therefrom at angles of about 45 degrees to horizontal planes. The streams of liquid which issue from the respective tubes or pipes 20 descend upon the top sides of the sheets which are guided underneath said tubes. The streams which issue from the intermediate tubes are projected upwardly against the under sides of the sheets as will be apparent from an inspection of the drawings. It will be noted that the lowermost of the series of tubes or pipes 20 is located underneath the lowermost of the sheets 5, which are guided underneath the said tubes, and its purpose is to provide means for projecting streams of the liquid against the under side of the lowermost sheet. A valve controlled pipe 40 is connected at one end of the pipe 23, the opposite outer end thereof terminating in the receptacle or tank 32. Plates 41 are provided upon the opposite sides of the series of sheets 5 in adjoining relation to the opposite ends of the series of tubes or pipes 20 for the purpose of guiding the liquid which may splash or escape outwardly from the opposite edges of the sheets into the receptacle or tank 32. The liquid which falls into the receptacle or tank 32 is conveyed therefrom through a pipe 42 to the receptacle 25 previously referred to. As a further means for catching the liquid which may escape from the sheets 5 I have provided a receptacle 45 from which the liquid may be discharged through an outlet 46 into the receptacle or tank 25.

The liquid 26 within the receptacle or tank 25 is heated, as above stated, by means of a heating coil 27 to a temperature such that the streams of liquid discharged from the tubes or pipes 20 onto and against the upper and lower sides of the sheets 5 will impart thereto the requisite temperature suitable to be employed in the manufacture of fiber board. The liquid should be applied to said sheets at a temperature which may range from about 38 degrees centigrade to about 93 degrees centigrade. Any suitable liquid may be employed, but that which at present is preferred by me is one containing a solution of zinc chloride, the same as that employed in the receptacle or tank 8 for the initial treatment of the sheets. After the sheets have been heated by the application of the heated liquid thereto, in the manner heretofore described, they are conducted in convergent relation to each other, as shown, and are brought together upon the upper side of the upper cylinder or drum of the co-acting or co-operating pressure drums or cylinders 50 and 51. These cylinders or drums preferably should be heated. The overlying sheets extend around the outer half portion of the cylinder or drum 50 and are carried between the drums 50 and 51 and are subjected thereby to a pressure requisite for effecting union thereof to produce the product, namely, fiber board or vulcanized fiber. After having been thus united the sheet is cut into desired lengths, washed and otherwise treated in the usual known manner.

Instead of conducting the sheets 5 from the guide rods 15 downwardly through a body of liquid containing a suitable chemical in solution as shown in Figs. 1 and 2 of the drawings I may conduct the same individually and separately underneath a series of tubes or pipes 60, as shown in Fig. 4, which are supported in a plane substantially parallel with the plane in which the tubes or pipes 20, previously described, are located. The tubes 60 are connected by means of short angularly related pipes 61 to a manifold pipe 62 to the lower end of which the solution containing the chemical, for example, zinc chloride, is supplied by means of a pipe 63 having connection at its lower end to the discharge side of a suitable pump 64, the opposite side of which is in communication with a receptacle 65 containing the solution 66. Any suitable liquid solvent and any suitable chemical may be employed but usually water is employed as the solvent and zinc chloride as the chemical. The solution generally is employed at a strength or density of about 70 degrees Baumé and at ordinary room temperature but the temperature may range from room temperature to a temperature of approximately 35 degrees centigrade. The supply of liquid solution to the pipes 60 is controlled by valves, not shown, which are identical with the valves 28, to which reference has been previously made for controlling the admission or supply of solution to the pipes 20.

The upper end of the manifold pipe 62 is provided with an upwardly projecting tubular extension 67 having connection at its upper end to a waste pipe 68, which is adapted to discharge any overflow of the solution into a receiving receptacle or tank 69. A valve controlled pipe 70 is connected at one end to the pipe 63, the opposite end thereof terminating within the receptacle or tank 69. The tubes 60 are provided with openings 71 (like the openings 35 in the tubes 20) which are adapted to discharge the solution onto and against the upper and lower sides of the sheets 5 in the same manner as has been described in connection with the said tubes 20.

In order that any liquid which may escape from the opposite sides or edges of the portions of the sheets 5 in adjoining relation to the opposite ends of the tubes 60 may be directed into the receptacle or tank 69 I have provided plates 72, only one of which is shown.

It will be noted that in the method and construction as illustrated in Fig. 4 the sheets 5 are bent but slightly in their passage from the guides 6 underneath the tubes or pipes 60 to the tubes or pipes 20. By thus avoiding the bending of the sheets the pulling tension necessary to the drawing of the sheets through the apparatus is decreased whereby liability of the cracking or breaking of the sheets is decreased.

In order to prevent waste of the solution which may escape from the portions of the sheets 5 which are located over the gap between either the tank or receptacle 8 or 69 and the tank or receptacle 32 I have provided a bridging plate 73, the opposite ends of which are flanged, as indicated.

It will be seen that by my invention I have provided a novel and simple method by the employment of which liquids or other fluids with or by which it is desired to treat the sheets of paper as they are conducted through the apparatus may be applied to both sides of each individual sheet.

Having thus described my invention what I claim and desire to secure by Letters Patent is:

1. The method of treating sheets of paper which are to be united to form fiber board which comprises the application thereto of a suitable chemical in solution and thereafter discharging streams of heated liquid of suitable character against each sheet, the said last mentioned liquid being maintained at a temperature necessary to heat the said sheets to the temperature requisite in the manufacture of fiber board.

2. The method of treating sheets of paper to be united to form fiber board which comprises the application of a suitable chemical in solution to both sides of each sheet at a temperature which may range from ordinary room temperature to a temperature of approximately 35 degrees centigrade, and thereafter discharging streams of heated liquid containing a suitable chemical in solution against both sides of each sheet, the liquid having a temperature necessary to heat the said sheets to a temperature requisite in the manufacture of fiber board.

3. The method of treating sheets of cellulose paper to be united to form fiber board which comprises the application of a suitable chemical in solution thereto, heating a body of liquid containing zinc chloride in solution and thereafter discharging streams of heated solution against the opposite sides of each sheet, the temperature of the said heated solution being such as to effect the heating of the said sheets to the temperature requisite in the manufacture of fiber board.

4. The method of treating cellulose sheets to be united to form fiber board which comprises the application of a solution of zinc chloride to both sides thereof at a temperature ranging from room temperature to a temperature of approximately 35 degrees centigrade, thereafter guiding each of the said sheets between a plurality of streams of a suitable heated liquid, the said streams striking against the opposite sides of said sheets and the said liquid being of a temperature sufficient to effect gelatinization of said sheets.

5. The method of manufacturing fiber board which consists in the application of a liquid containing a suitable chemical in solution to both sides of each of a plurality of sheets, the said liquid being of a temperature which may range from room temperature to a temperature of approximately 35 degrees centigrade, conveying said sheets between a plurality of streams of liquid of suitable character which streams impinge upon both sides of each sheet, maintaining the said streams of liquid at a temperature ranging from about 38 degrees to about 93 degrees centigrade, and thereafter bringing the said sheets together in overlying relation to each other and subjecting the same to compressive pressure to effect union thereof.

6. The method of manufacturing vulcanized fiber which consists in treating a sheet of paper with a suitable chemical in solution, the said solution having a temperature which may range from room temperature to a temperature of approximately 35 degrees centigrade, thereafter causing a plurality of streams of a heated fluid of suitable character to impinge upon said sheets, the said fluid having a temperature sufficient to effect gelatinization of said sheet, and thereafter employing said sheet in the formation of vulcanized fiber.

7. The method of making fiber board or vulcanized fiber which consists in the projection of streams of liquid containing a suitable chemical in solution simultaneously against the opposite sides of each of a plurality of sheets of cellulose paper, the temperature of which solution may range from room temperature to a temperature of approximately 35 degrees centigrade, conveying and guiding each of said sheets between a plurality of streams of a suitable heated liquid which streams impinge simultaneously upon both sides of each of said sheets, maintaining the liquid of the said streams at a temperature sufficient to heat the said sheets to a temperature requisite in the manufacture of fiber board or vulcanized fiber, thereafter bringing the said sheets together into contactual overlying relation with respect to each other, and subjecting the same to compressive pressure to effect union thereof.

In testimony that I claim the foregoing as my invention I have hereunto signed my name this 11th day of August, A. D. 1927.

WILLIAM M. SHOEMAKER, Jr.